May 19, 1964 E. F. ABRAMS ETAL 3,133,721
HERMETICALLY SEALED VALVE
Filed Sept. 29, 1961 2 Sheets-Sheet 2
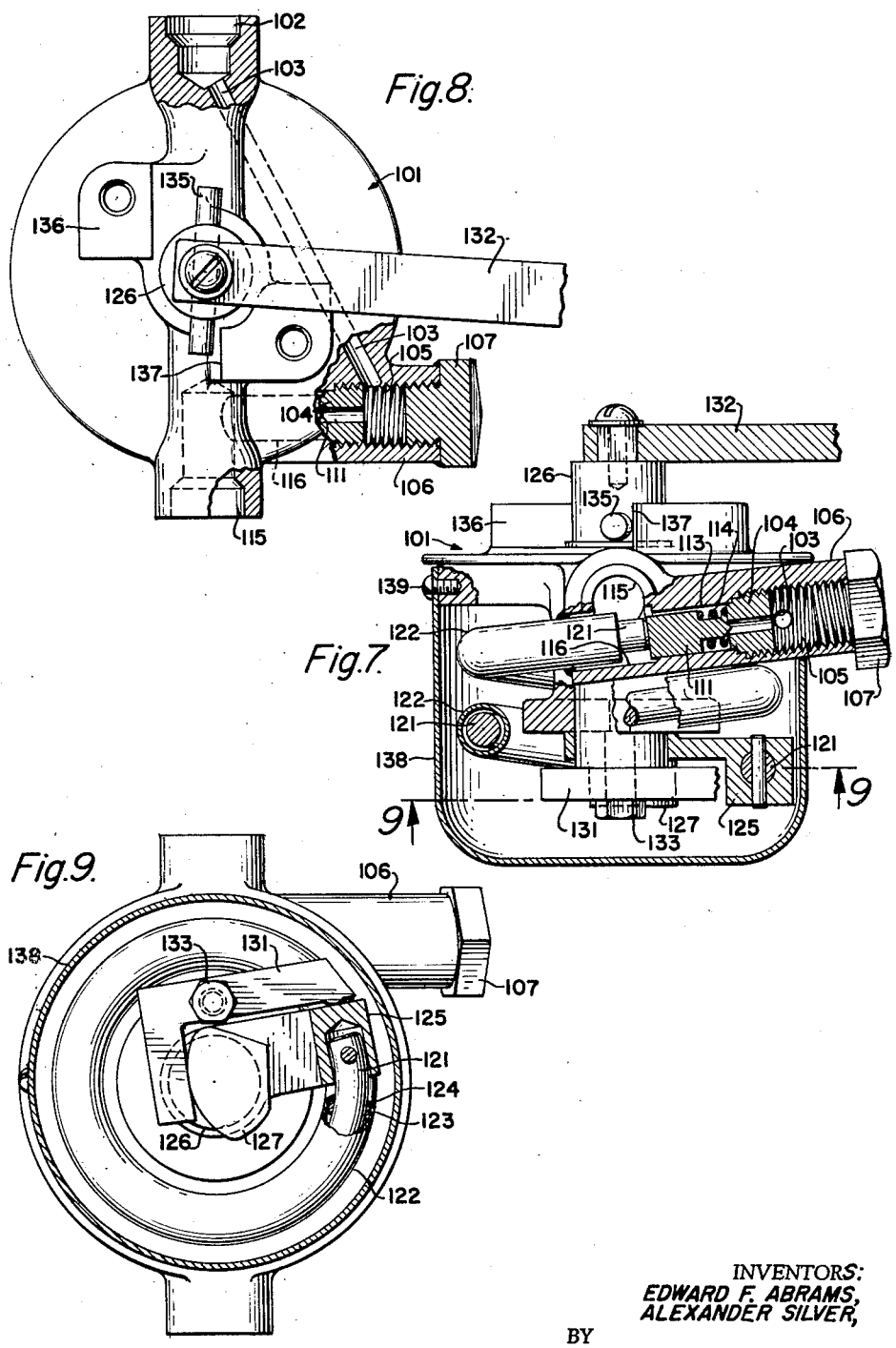
INVENTORS:
EDWARD F. ABRAMS,
ALEXANDER SILVER,
BY
Agent.

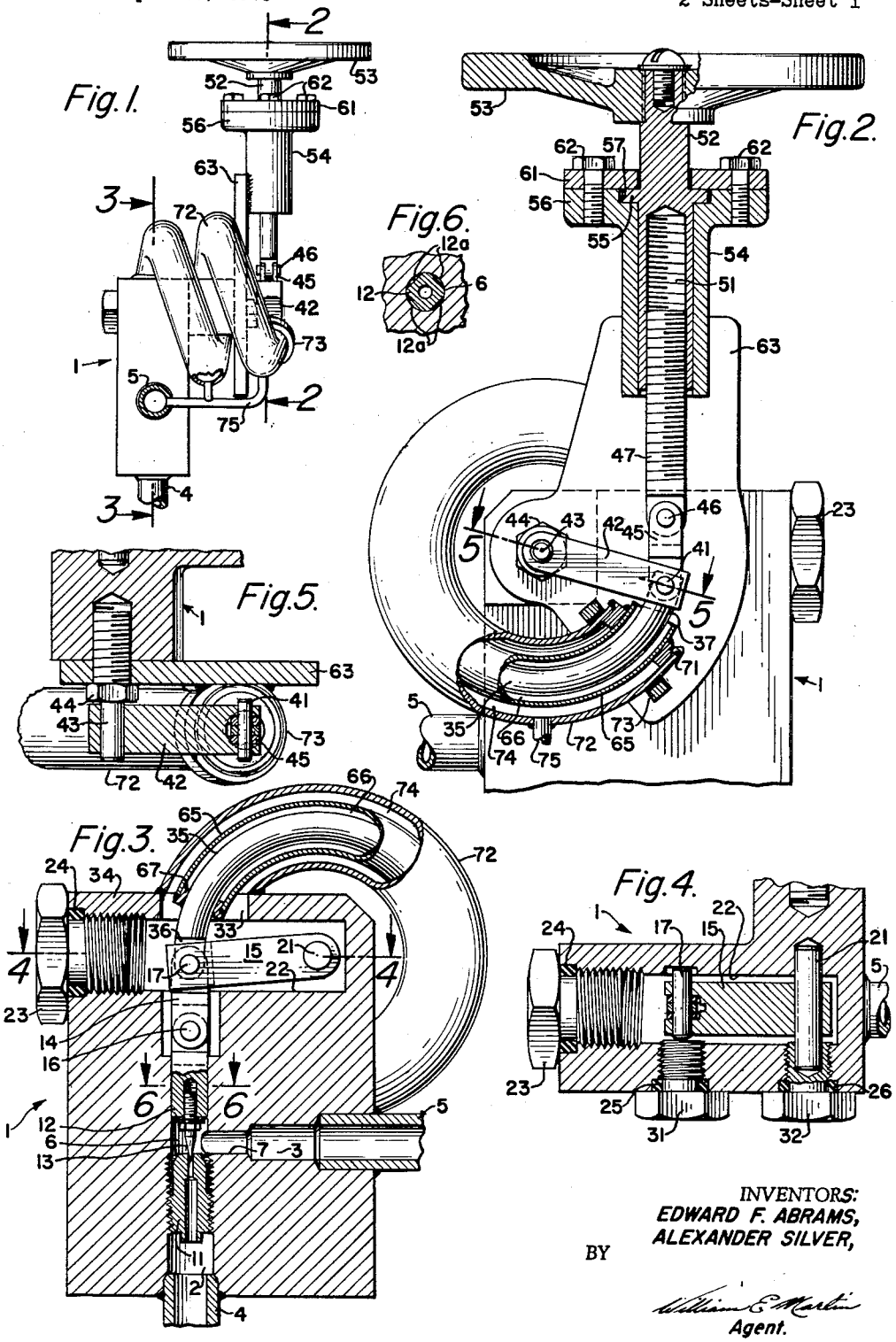

United States Patent Office 3,133,721
Patented May 19, 1964

3,133,721
HERMETICALLY SEALED VALVE
Edward F. Abrams, Glendale, and Alexander Silver, Tarzana, Calif., assignors to The Garrett Corporation, Los Angeles, Calif., a corporation of California
Filed Sept. 29, 1961, Ser. No. 141,725
15 Claims. (Cl. 251—214)

This invention pertains to an improvement in valves and, more particularly, to a valve embodying a packless construction whereby motion may be imparted to a flow controlling element disposed internally of a hermetically sealed enclosure by means of actuator mechanism disposed externally thereof. The invention teaches certain useful improvements over our previous invention described in U.S. Patent No. 2,981,515, issued April 25, 1961, entitled Motion Transmitting Device.

In chemical and other processes where it is desired to regulate the flow of toxic, corrosive or otherwise hazardous fluids at extremely high pressures, the provision of externally operable valve means capable of affording the required degree of control without risk of fluid leakage in the region of relatively movable elements of the actuating mechanism presents a problem for which the prior art teaches no wholly satisfactory solution. In what is perhaps one of the most widely used valve constructions taught by the prior art, a valve actuating mechanism, which may, for example, comprise a translating screw or the like, includes an emergent shaft disposed for cooperation with a suitable packing gland or stuffing box for opposing fluid leakage between the interior and exterior of the valve body. Where no possibility of eventual leakage between the interior and exterior of the valve body can be tolerated, however, such a construction is generally unsatisfactory. In the latter circumstance, a well-known alternative is to employ a construction wherein the emergent shaft or stem is isolated from the interior of the valve body by, and disposed for cooperation with, a flexible hermetic seal, such as a bellows or diaphragm, which may in turn be operatively connected with a movable flow regulating element disposed internally of the valve body. Such a construction, however, while satisfactory for use at relatively low working pressures, is not readily adaptable to the extremely high pressures sometimes encountered in modern industrial practice. At such pressures, which may, for example, be as high as ten thousand pounds per square inch or, in some instances, even higher, the thickness of material needed to provide a bellows or diaphragm seal of adequate mechanical strength introduces an elastic force of substantial magnitude which, acting as it does in concert with the load due to differential pressure across the projected area of the seal, leads to a requirement for disproportionately large valve actuating forces which may exceed otherwise practical limits. It is a primary aim of the instant invention, therefore, to teach a novel construction whereby fluid flow, and particularly the flow of toxic, corrosive or hazardous fluids, may be safely and effectively regulated over a wide range of working pressures by means of a hermetically sealed valve which requires only a moderate actuating force.

A principal object of the invention is to provide a hermetically sealed valve wherein a control element disposed internally thereof may be positioned by an externally disposed actuating member without prejudice to the integrity of the hermetic seal.

Another object of the invention is to provide externally operable motion transmitting means for positioning an internally disposed element of a hermetically sealed valve.

Another object of the invention is to provide externally operable means for applying motive force to a valve element disposed internally of a hermetically sealed enclosure.

Another object of the invention is to provide a helically coiled sealing element for accommodating the motion of a relatively movable member.

Another object of the invention is to provide a resiliently deformable sealing element which may be designed to accommodate various degrees of relative motion without increase in the stress imposed thereby on the structure of the element.

Another object of the invention is to provide a valve wherein the force due to differential pressure acting across a resiliently deformable hermetic seal is not additively combined with the force to the elasticity or stiffness of said seal.

These and other objects, which will be made further apparent hereinafter, are achieved in the present invention by means of a valve having a helically coiled actuating member or stem enclosed in a hermetically sealed tubular envelope, the latter being helically coiled coaxially with the former and elastically deformable relative thereto. In each of the two embodiments of the invention illustrated in connection therewith there is provided a valve body having fluid inlet and outlet ports inter-connected with each other by passage means wherein are disposed a fixed valve seat and a relatively movable valve element or obturator for cooperation therewith. The valve element is operatively connected with an elongate, helically coiled valve stem or actuating rod extending outwardly of the valve body for engagement by a suitable operating mechanism, the emergent portion of the stem being enclosed by a coaxially coiled tube cooperative therewith to form an elastically deformable seal for the aperture through which the stem emerges from the valve body. An externally disposed operating mechanism is preferably so arranged as to apply a tensile or compressive force to the outwardly extending end of the valve stem, thereby causing the latter to be rotated about the axis of the helix defined thereby and to transmit the force to the internally disposed valve element. Depending upon the direction of the applied operating force, the valve element may be moved into or out of engagement with the seat. In connection with the two embodiments of the invention disclosed herein, it is to be understood and particularly noted that the helically coiled valve stem, despite its geometric similarity to the well-known form of a coil spring, acts primarily as a tension or compression link and therefore behaves substantially as a rigid body, the coaxially coiled tubular envelope therefor being itself elastically deformable, in spring-like manner, to accommodate relative movement of the stem.

In one of the embodiments herein disclosed the actuating mechanism takes the form of an axially fixed cylindrical nut threadedly engaging a relatively movable rod which is connected, through a linkage, to a helically coiled valve stem or actuating member, the nut being rotatable in either direction by means of a handwheel or other suitable manual or powered driving means; thus, either tensile or compressive force may be applied to the outwardly extending end of the valve stem according to the direction in which the driving means is rotated, the various elements of the mechanism being preferably so arranged that, when a handwheel is employed as the driving means, the valve may be opened by a counter-clockwise rotation and closed by a clockwise rotation thereof in accordance with conventional practice.

In a second embodiment of the invention disclosed herein, the operating mechanism comprises a shaft disposed coaxially of a helically coiled valve stem or actuating member, the shaft being provided at one end with a rotatable handle and at the other end with a cam for cooperation with a rocker arm whereby a compressive force may be applied to the outwardly extending end of the coiled stem, the latter being biased for movement in the opposite direction by the elasticity of a tubular envelope disposed in hermetically sealing relation with the valve body. Thus rotation of the operating handle in one direction causes the cam and rocker arm combination to impose a compressive force on the valve stem so as to urge the movable valve element toward the closed position; and rotation of the handle in the opposite direction, being effective to relieve the compressive force on the stem, permits the valve element to be moved toward the open position under the influence of a suitably placed biasing spring.

It will of course be understood, however, that the two operating mechanisms specifically disclosed herein are described and illustrated for exemplary purposes only, a variety of well-known mechanisms being readily adaptable to the purposes of the invention by those skilled in the art.

The invention will be more clearly understood by reference to the accompanying drawings which are illustrative of two embodiments thereof. In the drawings, wherein like elements are designated throughout by like reference numerals:

FIG. 1 is a side elevation of a valve embodying the invention;

FIG. 2 is a sectional view on an enlarged scale taken along the line 2—2 of FIG. 1;

FIG. 3 is a sectional view on the same scale as FIG. 2 taken along the line 3—3 of FIG. 1;

FIG. 4 is a sectional view taken along the line 4—4 of FIG. 3;

FIG. 5 is a sectional view taken along the line 5—5 of FIG. 2;

FIG. 6 is a cross-section taken along the line 6—6 of FIG. 3;

FIG. 7 is a side elevation, partially broken away, illustrating an alternate embodiment of the invention;

FIG. 8 is a top plan view, partially broken away, of the embodiment illustrated in FIG. 7; and FIG. 9 is a bottom plan view taken along the line 9—9 of FIG. 8.

Referring first to the embodiment of the invention illustrated in FIGS. 1 through 6, there is shown a valve assembly comprising a valve body 1 having an inlet port 2 and an outlet port 3 for the accommodation of externally disposed fluid carrying conduits 4 and 5 respectively, the ports 2 and 3 being placed in flow communication with each other by mutually intersecting bores or passages 6 and 7 disposed internally of the valve body 1. The externally disposed conduits 4 and 5 are here shown as being secured in the ports 2 and 3 by welding, it being understood, however, that other well-known methods for securing a fluid-tight joint, as, for example, by means of a threaded coupling, may of course be used.

The bore 6 houses a valve seat 11 for cooperation with a relatively movable valve element or obturator 12, the seat 11 preferably being adjustably secured in the bore 6 as by threaded engagement therewith as shown. The obturator 12, which is here shown as including a needle 13 for flow metering engagement with the seat 11, is operatively connected by means of a link 14 with an angularly movable radius arm 15, the obturator 12 and radius arm 15 being pivotally connected with the link 14 by pins 16 and 17.

As shown in FIGS. 3 and 4, the radius arm 15, which is mounted for rotation about an axis defined by pin 21, is housed in a transverse bore 22, the latter being hermetically sealed by a threaded plug 23 and a resiliently deformable gasket 24. In like manner, access passages which are provided in valve body 1 for the insertion of pins 17 and 21 into radius arm 15 and link 14 during initial assembly thereof, are sealed by gaskets 25 and 26 secured by threaded plugs 31 and 32, respectively, the latter serving additionally to journal one end of pin 21.

An aperture 33 is provided in the end wall 34 of valve body 1 for the introduction thereinto of a helically coiled valve actuating member or stem 35. The inwardly extending end 36 of the stem 35 is pivotally connected through pin 17 with radius arm 15 and link 14, and the outwardly extending end 37 is pivotally connected through pin 41 to a second radius arm 42. The radius arm 42 is mounted for rotation substantially coaxially with the radius arm 15, the pivot axis of the arm 42 being defined by a pin 43 extending outwardly from, and preferably forming a unitary structure with, a threaded stud 44. Radius arm 42 is connected through link 45 and pins 41 and 46 with a rod 47 which is threadedly disposed for cooperation with a bore 51 extending axially of a control shaft 52 upon which there is mounted a suitable handwheel 53 for rotation thereof. The shaft 52 is journaled in a sleeve 54 and maintained in fixed axial relation therewith by means of a thrust collar 55 which may preferably be formed integrally with the shaft 52. The collar 55 is disposed in bilateral thrust-transmitting relation with the sleeve 54 by means of a terminal flange 56 formed integrally thereon and including a recess 57 which is closed by a thrust plate 61 secured to the flange 56 by bolts 62. The sleeve 54 is fixedly mounted on a suitable plate or bracket 63 which is in turn fixedly attached to the valve body 1. From the foregoing description of the valve operating mechanism it will be apparent that motion imparted to the rod 47 by rotation of the handwheel 53 will be transmitted through the link 45 to the outwardly extending end 37 of the helically coiled valve stem 35, the latter being constrained by the cooperative action of the radius arms 15 and 42 to rotate about an axis defined by pins 17 and 43. At the inwardly extending end 36 of the valve stem 35, the rotary motion thereof will, in turn, be reconverted by the link 14 to a proportionate rectilinear motion for application to the valve element or obturator 12, thereby moving the latter into or out of engagement with the seat 11 according to the direction in which handwheel 53 is rotated.

It will be further apparent that what has been thus far described is a valve mechanism which incorporates a kinematic chain of essentially well-known type whereby a rotary motion imparted to one member of a threaded pair located externally of a valve body may be converted to a rectilinear motion for transmission to an internally disposed movable valve element the position of which relative to a fixed seat it is desired to control. Because of the unique shape of one member of the aforementioned kinematic chain, however, it is possible to provide an elastically deformable envelope therefor whereby the internally disposed valve element and the externally disposed actuating mechanism may be hermetically isolated from each other without prejudice to the action of either. The manner in which this end is achieved by the present invention will now be described.

The substantially rigid, helically coiled valve stem 35 is enclosed in a comparatively flexible, coaxially coiled tube 65, the latter having an inside diameter of slightly larger dimension than the outside diameter of the stem 35, thereby to provide an annular clearance space 66 for the accommodation of relative movement between the two elements. The tube 65 is secured to the stem 35 adjacent the inwardly extending end 36 thereof, the tube and stem being both preferably welded or otherwise sealably joined to an intermediate spacer ring 67 whereby the aforesaid clearance space 66 may be maintained. The outwardly extending end of tube 65 is similarly welded or otherwise sealably joined by means of a second spacer ring 71 to a second enveloping tube 72 which is of comparatively rigid construction and is preferably supported in spaced relation to mounting plate 63 as by annular bracket 73. The tube 72 is helically coiled coaxially with stem 35 and tube 65 to define a second annular clearance space 74 surrounding the latter and substantially coextensive therewith. The inwardly extending end of tube 72 is sealably joined, as for example by welding, to the end wall 34 of valve body 1 so as to close the aperture 33 through which valve stem 35 and tube 65 are introduced thereinto. In order to accommodate relative movement between the tube 72 and the valve stem 35, both of which are substantially rigid, intermediate tube 65, which establishes the mechanical connection therebetween, is designed for comparative flexibility. Thus, a compressive or tensile force applied to the outwardly extending end 37 of the stem 35 results in a corresponding elastic deflection of the tube 65, the helix defined by the latter being proportionately extended or compressed according to the direction of the applied force. By way of example, if a compressive force is applied by the rod 47 to the valve stem 35 so as to urge the valve element 12 into engagement with seat 11, the inwardly extending 36 of the stem 35 (as viewed in FIG. 3) will be rotated counterclockwise, and the resulting deformation of tube 65 will be reflected in a combination of bending and torsional stresses distributed throughout the length thereof; conversely, if a tensile force be applied to the outwardly extending end 37 of the stem 35, the inwardly extending end 36 thereof will be rotated clockwise (as viewed in FIG. 3) and correspondingly directed torsional and bending stresses will be developed in tube 65. It is to be understood, of course, that though the two ends of the tube 65 are angularly displaced relative to each other in consequence of motion imparted to the stem 35, such displacement does not reflect an actual elongation or foreshortening of the tube itself, but rather an elastic deformation or distortion of the helix defined thereby. Thus, if the end 36 of the stem 35 is rotated in a counter-clockwise direction as viewed in FIG. 3, the diameter of the helix defined by the tube 65 will be reduced and the included angle, or arc, of the helix will be proportionately increased; conversely, for clockwise rotation of the end 36, the diameter of the helix defined by the tube 65 will be increased and the included angle or arc decreased. It is in order to accommodate these deformations that the clearance spaces 66 and 74 are provided.

By reference to FIG. 3 of the drawing it will be seen that fluid pressure acting against the face of valve element 12 would tend to oppose motion thereof in the direction corresponding to valve closure. In order to overcome this tendency and, at the same time, to preclude stagnation of fluid internally of the tube 72, suitable passages for drainage and pressure balance are provided. Referring to FIG. 6 it will be seen that the valve element 12 comprises a cylindrical body having a plurality of flats 12a formed in the lateral surface thereof for cooperation with the adjoining bore 6 to define a corresponding plurality of leakage paths longitudinally of the element. Fluid passed by the aforesaid leakage paths will, of course, tend to fill the bore 22 surrounding radius arm 15 and to enter the clearance space 74 intermediate the tubes 65 and 72. As is most clearly shown in FIG. 1, however, the clearance space 74 is placed in communication with the outlet conduit 5 by means of a drainage manifold 75, the latter preferably including passages for communication with each turn or convolution of the tube 72. Thus, the valve element 12 is enabled to function in a balanced pressure environment and stagnation of fluid in the clearance space 74 surrounding the valve actuating mechanism is avoided.

From the foregoing it will be seen that the embodiment of the invention illustrated in FIGS. 1 through 6 provides a valve construction wherein a hermetically sealed kinematic chain for transmitting motion from an externally disposed actuator or control mechanism to an internally disposed valve element or obturator includes a coiled member enclosed in a similarly coiled envelope of double wall construction, one wall of said envelope being elastically deformable relative to the other wall thereof and to the coiled member.

Where there is no need to avoid fluid stagnation in the coiled envelope of the valve actuating member, a single wall construction therefor may be used to advantage, an alternate form of the invention which embodies such a construction being illustrated in FIGS. 7, 8 and 9 of the appended drawings.

Referring to FIG. 7, there is shown a side elevation, partially broken away, of a hermetically sealed valve embodying the instant invention in somewhat different form from that hereinbefore described. In the construction shown, a valve body 101 includes an inlet port 102 communicating via a passage 103 with one side of a valve seat 104, the latter being threadedly mounted in a chamber 105 defined by a boss 106 which is disposed approximately tangentially of the valve body 101, the chamber 105 being closed and sealed by a threaded plug 107. A movable valve element 111, the lateral surface of which is grooved for the accommodation of flow longitudinally thereof, is disposed in a bore 113 for cooperation with the seat 104, the element 111 being biased toward the open position by means of a spring 114. Flow past the valve element 111 is conducted to an outlet port 115 via a chamber or counterbore 116, the outlet port 115 and counterbore 116 being disposed at a substantially right angle to each other and in mutually intersecting relation.

A helically coiled valve actuating member or stem 121 is introduced into the valve body 101 via the counterbore 116, the stem 121 and valve element 111 being maintained in mutualy abutting relation by means of the biasing spring 114. The coiled valve stem 121 is enclosed in a coaxially coiled, relatively flexible tube or envelope 122, one end of which is fitted into the counterbore 116 and hermetically sealed thereto, as by welding, and the other end of which is hermetically sealed to the stem 121 adjacent the outwardly extending end thereof, as by an annular spacer 123 and weld 124. The outwardly extending end of stem 121 is secured in a recess provided therefor in a radius arm 125 which is pivoted on a control shaft 126, the latter being journaled in valve body 101 for rotation coaxially of the helix defined by the stem 121.

The shaft 126 is provided at one end with a cam 127 for cooperation with a bell-crank or rocker arm 131, and at the other end with an elongated handle 132 whereby the cam 127 may be rotated to effect a desired movement of the rocker arm 131. The rocker arm 131 is pivoted about a bolt 133 which is threaded into valve body 101, the rocker arm 131 and radius arm 125 being spring biased in mutually abutting relationship by means of the tubular envelope 122. As the cam 127 is rotated in a counter-clockwise direction (as viewed in FIG. 9) the rocker arm 131 and radius arm 125 will be rotated in a clockwise direction so as to advance the valve stem 121 into the chamber or counterbore 116 and urge the valve element 111 into engagement with the seat 104. Conversely, if the cam 127 is rotated clockwise (as viewed in FIG. 9), the spring bias imposed thereon by the tubular envelope 122 will cause the valve stem 121 to be moved outwardly of the chamber 116, thereby permitting the valve element 111 to be withdrawn or disengaged from the seat 104 by the action of biasing spring 114.

In order to limit the rotation of operating handle 132 to the arc needed to impart the desired movement to the element 111, the shaft 126 may preferably be provided with a suitable stop means, such provision being exemplified in the instant embodiment of the invention by the pin 135 disposed transversely of the shaft 132 for cooperation wtih limit stops 136 and 137 which may preferably be formed integrally with valve body 101.

Though the valve body 101 is hermetically sealed by the tube 122 in hereinbefore described manner, it may, of course, be desirable to protect the actuating mechanism from dirt or accidental damage, and for this purpose an outer cover 138, which may be suitably secured to the valve body 101 as by screws 139, is provided, it being understood that the cover 138 serves only by way of a mechanical protection for the valve mechanism and not by way of a seal or pressure vessel therefor.

From the foregoing description of two embodiments thereof, it will be apparent that the instant invention comprehends a novel construction for a hermetically sealed valve wherein the position of a relatively movable flow regulating element may be controlled by means disposed externally of the enclosure therefor. While the invention has been described with particular reference to two preferred embodiments thereof, it is anticipated that numerous variations on particular features of the construction shown may be practiced by those skilled in the art, and it is our desire that all such variations falling within the spirit and scope of the invention be secured to us by Letters Patent.

We claim:

1. A hermetically sealed valve which comprises: a valve body having an inlet, an outlet, and a valve seat; a relatively movable valve element disposed internally of said valve body for cooperation with said seat to control communication between said inlet and said outlet; a helically coiled valve actuating stem having one end operatively connected with said element, said valve body being apertured to permit the other end of said stem to extend outwardly thereof; a helically coiled tube enclosing the outwardly extending portion of said stem, one end of said tube being hermetically sealed to said valve body annularly of said aperture and the other end of said tube being hermetically sealed to said stem adjacent the outwardly extending end thereof; and means for rotating the outwardly extending end of said stem substantially coaxially of said helix, thereby to move said element relative to said seat.

2. A hermetically sealed valve which comprises: a valve body having an inlet, an outlet, and a valve seat; a relatively movable valve element disposed internally of said valve body for cooperation with said seat to control communication between said inlet and said outlet; an elongate stem having first and second ends, said stem being coiled to form a helix disposed substantially externally of said valve body, said first end being introduced into said valve body through an aperture therein and operatively connected with said element; a helically coiled tube enclosing the externally disposed portion of said stem, one end of said tube being hermetically sealed to said valve body annularly of said aperture and the other end of said tube being hermetically sealed to said stem adjacent said second end thereof; and force applying means operatively connected with said second end whereby said stem may be rotated about the axis of said helix to impart motion to said element.

3. A hermetically sealed valve which comprises: a valve body having an inlet, an outlet and a valve seat; a relatively movable valve element disposed internally of said valve body for cooperation with said seat to control communication between said inlet and said outlet; an elongate stem having first and second ends, said stem being coiled to form a helix disposed substantially externally of said valve body, said first end being introduced into said valve body through an aperture therein and operatively connected with said element; a helically coiled tube enclosing said stem, one end of said tube being hermetically sealed to said valve body annularly of said aperture and the other end of said tube being hermetically sealed to said stem adjacent said second end thereof, said tube being flexible relative to said stem; and force applying means operatively connected with said second end whereby said stem may be rotated about the axis of said helix to impart motion to said element.

4. A hermetically sealed valve which comprises: a valve body having an inlet, an outlet, and a valve seat; a relatively movable valve element disposed internally of said valve body for cooperation with said seat to control communication between said inlet and said outlet; an elongate stem having first and second ends, said stem being coiled to form a helix disposed substantially externally of said valve body, said first end being introduced into said valve body through an aperture therein and operatively connected with said element; a helically coiled tube enclosing the externally disposed portion of said stem, said tube being flexible relative to said stem and having an inside diameter slightly greater than the outside diameter of said stem to define an annular clearance space adjacent thereto, one end of said tube being hermetically sealed to said valve body annularly of said aperture and the other end of said tube being hermetically sealed to said stem adjacent said second end thereof; and force applying means operatively connected with said second end whereby said member may be rotated about the axis of said helix to impart motion to said element.

5. A hermetically sealed valve which comprises: a valve body having an inlet, an outlet, and a valve seat, a relatively movable valve element disposed internally of said valve body for cooperation with said seat to control communication between said inlet and said outlet; an elongate valve stem having first and second ends, said stem being coiled to form a helix disposed substantially externally of said valve body, said first end being introduced into said valve body through an aperture therein and operatively connected with said element; a first tubular envelope coiled coaxially of said stem and enclosing the same, said envelope being hermetically sealed to said stem adjacent said first end thereof; a second tubular envelope coiled coaxially of and enclosing said first envelope, one end of said second envelope being hermetically sealed to said valve body annularly of said aperture and the other end thereof being hermetically sealed to said first envelope adjacent said second end of said stem; and force applying means operatively connected with said second end for rotating said stem about the axis of said helix to impart motion to said valve element.

6. A hermetically sealed valve which comprises: a valve body having an inlet and an outlet and a valve seat; a relatively movable valve element disposed internally of said valve body for cooperation with said seat to control communication between said inlet and said outlet; an elongate valve stem having first and second ends, said stem being coiled to form a helix disposed substantially externally of said valve body, said first end being introduced into said valve body through an aperture therein and operatively connected with said element; a first tubular envelope coiled coaxially of said stem and enclosing the same, said envelope being hermetically sealed to said stem adjacent said first end thereof; a second tubular envelope coiled coaxially of and enclosing said first envelope, one end of said second envelope being hermetically sealed to said valve body annularly of said aperture and the other end thereof being hermetically sealed to said first envelope adjacent said second end of said stem; screw means comprising a pair of cooperably threaded members disposed externally of said valve body, one of said members being axially fixed relative to said body and the other of said members being operatively connected with said second end of said stem for imparting torque to said stem in response to rotation of said one member.

7. A hermetically sealed valve which comprises: a valve body having an inlet, an outlet, and a valve seat; a relatively movable valve element disposed internally of said valve body for cooperation with said seat to control communication between said inlet and said outlet; an elongate valve stem coiled to form a helix disposed substantially externally of said valve body, one end of said stem being introduced into said valve body through an aperture therein and operatively connected with said element; means mechanically restraining the ends of said stem for rotation about the axis of said helix; a first tubular envelope annularly spaced from said stem and coiled coaxially therewith to enclose the same, said envelope being flexible relative to said stem and hermetically sealed thereto adjacent said introduced end thereof; a second tubular envelope annularly spaced from said first envelope and coiled coaxially therewith, one end of said second envelope being hermetically sealed to said valve body annularly of said aperture and the other end thereof being hermetically sealed to said first envelope adjacent the externally disposed end of said stem; and force applying means operatively connected with said externally disposed end of said stem for rotating the same about the axis of said helix to impart motion to said valve element.

8. A hermetically sealed valve which comprises: a valve body having an inlet, an outlet, and a valve seat; a relatively movable valve element disposed internally of said valve body for cooperation with said seat to control communication between said inlet and said outlet; an elongate valve stem coiled to form a helix disposed substantially externally of said body, one end of said stem being introduced into said valve body through an aperture therein and operatively connected with said element; a first radius arm disposed internally of said valve body and operatively connected with said introduced end of said stem, said arm being pivoted for rotation about the axis of said helix; a second radius arm disposed externally of said valve body and operatively connected with the end of said stem opposite said introduced end, said second radius arm being pivoted coaxially of said first radius arm and said helix, thereby to constrain said stem for rotation about said axis; a first tubular envelope annularly spaced from said stem and coiled coaxially therewith to enclose the same, said envelope being flexible relative to said stem and hermetically sealed thereto adjacent said introduced end thereof; a second tubular envelope annularly spaced from said first envelope and coiled coaxially therewith, one end of said second envelope being hermetically sealed to said valve body annularly of said aperture and the other end being hermetically sealed to said first envelope adjacent said opposite end of said stem; and force applying means operatively connected with said opposite end of said stem for rotating the same about the axis of said helix to impart motion to said valve element.

9. A hermetically sealed valve which comprises: a valve body having an inlet, an outlet, and a valve seat; a relatively movable valve element disposed internally of said valve body for cooperation with said seat to control communication between said inlet and said outlet; an elongate valve stem coiled to form a helix disposed substantially externally of said valve body, one end of said stem being introduced into said valve body through an aperture therein and operatively connected with said element; a first radius arm disposed internally of said valve body and operatively connected with said introduced end of said stem, said arm being pivoted for rotation about the axis of said helix; a second radius arm disposed externally of said valve body and operatively connected with the end of said stem opposite said introduced end, said second radius arm being pivoted coaxially of said first radius arm and said helix, thereby to constrain said stem for rotation about said axis; a first tubular envelope annularly spaced from said stem and coiled coaxially therewith to enclose the same, said envelope being flexible relative to said stem and hermetically sealed thereto adjacent said introduced end thereof; a second tubular envelope annularly spaced from said first envelope and coiled coaxially therewith, one end of said second envelope being hermetically sealed to said valve body annularly of said aperture and the other end thereof being hermetically sealed to said first envelope adjacent said opposite end of said stem; screw means comprising a pair of cooperably threaded members disposed externally of said valve body, one of said members being axially fixed relative to said body and the other of said members being operatively connected with said opposite end of said stem for imparting torque to said stem about the axis of said helix in response to rotation of said one member, thereby to cause movement of said introduced end of stem and said element.

10. In a valve having a body which encloses a valve seat and a relatively movable valve element disposed for cooperation therewith to control fluid flow through said body from an inlet to an outlet, hermetically sealed means for transmitting motion from an externally disposed actuator mechanism to said enclosed element which comprises: an aperture in said body providing access to said element; a helically coiled stem disposed substantially externally of said body, one end of said stem being disposed in motion receiving relation with said actuator mechanism and the other end being introduced into said body through said aperture and disposed in motion transmitting relation with said element; and a tubular envelope hermetically sealed to said body annularly of said aperture, said envelope being coiled coaxially of said stem and annularly spaced therefrom to enclose the externally disposed portion thereof, said envelope being flexible relative to said stem and hermetically sealed thereto adjacent said one end thereof.

11. In a valve having a body which encloses a valve seat and a relatively movable valve element disposed for cooperation therewith to control fluid flow through said body from an inlet to an outlet, hermetically sealed means for imparting a desired motion to said enclosed element which comprises: an aperture in said body providing access to said element; an elongate stem coiled to form a helix disposed substantially externally of said body, one end of said stem being introduced into said body through said aperture and disposed in motion transmitting relation with said element; a tubular envelope hermetically sealed to said body annularly of said aperture, said enveloped being coiled coaxially of said stem and annularly spaced therefrom to enclose the externally disposed portion thereof, said envelope being flexible relative to said stem and hermetically sealed thereto adjacent the end thereof opposite said introduced end; a radius arm operatively connected with said opposite end of said stem, said arm being pivoted about the axis of said helix; and means for rotating said arm about said axis for imparting motion to stem, thereby to cause said motion to be transmitted to said element by said introduced end of said stem.

12. A valve as set forth in claim 11 in which said means for rotating said arm comprises: a rocker arm fulcrumed about an axis parallel to the axis of said helix, one end of said rocker arm being disposed in force transmitting relation with said radius arm; a cam disposed in force transmitting relation with the other end of said rocker arm; and shaft means operatively connected with said cam for rotation thereof, said shaft means being journaled in said body coaxially of said radius arm.

13. Mechanism for transmitting motion from the exterior to the interior of a hermetic body, comprising: a coiled, relatively rigid stem having one end portion located exteriorly of said body and its other end portion extending to the interior of said body through an opening therein, a coiled, relatively flexible, fluid impermeable tube enclosing said one end portion of said stem, means sealing one end of said tube to said stem, and means sealing the other end of said tube to said body about said opening, whereby said stem can be moved longitudinally with respect to said body about the axis of the coil of said stem.

14. Mechanism for transmitting motion from the exterior to the interior of a hermetic body, comprising: a coiled, relatively rigid stem having one end portion located exteriorly of said body and its other end portion extending to the interior of said body through an opening therein, a coiled, relatively flexible, fluid impermeable metal tube enclosing said one end portion of said stem, the internal diameter of said tube being greater than the diameter of said stem, whereby a space exists between the stem and the tube, means sealing one end of said tube to said stem, means sealing the other end of said tube to said body about said opening, means supporting the inner end of said stem on said body for rotation about the axis of the coil of the stem, and exteriorly operable means on said body operatively connected to the outer end of said stem for rotating the latter about said axis.

15. A valve comprising a valve body, a coiled, relatively rigid stem having one end portion located exteriorly of said body and its other end portion extending to the interior of said body through an opening therein, a coiled, relatively flexible, fluid impermeable metal tube enclosing said one end portion of said stem, the internal diameter of said tube being greater than the diameter of said stem, whereby a space exists between the stem and the tube, means sealing one end of said tube to said stem, means sealing the other end of said tube to said body about said opening, means supporting the inner end of said stem on said body for rotation about the axis of the coil of the stem, exteriorly operable means on said body operatively connected to the outer end of said stem for rotating the latter about said axis, a valve element within said body and operatively connected to the inner end of said stem for movement of said element upon movement of said stem, and said body having a fluid passage with a valve seat thereabout disposed for cooperation with said valve element to regulate fluid flow through said passage.

References Cited in the file of this patent

UNITED STATES PATENTS 1,398,025    James _____ Nov. 22, 1921

FOREIGN PATENTS 481,605    Great Britain _____ Mar. 15, 1938